(12) United States Patent
Cruz Lopez et al.

(10) Patent No.: US 10,407,959 B2
(45) Date of Patent: Sep. 10, 2019

(54) VEHICLES, LATCHES AND LATCH ASSEMBLIES WITH RETAINING BRACKETS

(71) Applicant: GM GLOBAL TECHNOLOGY OPERATIONS LLC, Detroit, MI (US)

(72) Inventors: Jairo Abraham Cruz Lopez, Cuautitlan Izcalli (MX); Denise Valle Aguilar, Toluca de Lerdo (MX); Gustavo Eduardo Valencia Cruz, Coyoacan (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 136 days.

(21) Appl. No.: 15/627,315

(22) Filed: Jun. 19, 2017

(65) Prior Publication Data
US 2018/0363344 A1 Dec. 20, 2018

(51) Int. Cl.
| | | |
|---|---|---|
| *E05D 11/10* | (2006.01) | |
| *E05D 3/02* | (2006.01) | |
| *B62D 43/00* | (2006.01) | |
| *B62D 43/10* | (2006.01) | |
| *B60R 5/04* | (2006.01) | |

(52) U.S. Cl.
CPC .......... *E05D 11/1085* (2013.01); *B60R 5/044* (2013.01); *B62D 43/005* (2013.01); *B62D 43/10* (2013.01); *E05D 3/02* (2013.01); *E05D 2011/1035* (2013.01); *E05Y 2900/536* (2013.01); *E05Y 2900/538* (2013.01)

(58) Field of Classification Search
CPC ......... E05D 11/1085; E05D 2011/1035; E05Y 2900/538
USPC ............................................ 296/37.8, 146.11
See application file for complete search history.

(56) References Cited

U.S. PATENT DOCUMENTS

| | | | | |
|---|---|---|---|---|
| 4,932,101 A | * | 6/1990 | Lualdi | ................... E05D 7/1044 16/255 |
| 7,261,356 B1 | * | 8/2007 | Taylor | ..................... B60P 1/435 296/146.11 |
| 7,823,960 B2 | * | 11/2010 | Sauer | ....................... B60R 7/06 296/187.05 |

FOREIGN PATENT DOCUMENTS

| | | |
|---|---|---|
| DE | 19909500 A1 | 9/2000 |
| EP | 2354400 A1 | 10/2011 |

* cited by examiner

*Primary Examiner* — Jason S Morrow
(74) *Attorney, Agent, or Firm* — Lorenz & Kopf, LLP

(57) ABSTRACT

Vehicles, latches and latch assemblies are provided with retaining brackets for selective engagement with hinges. In an exemplary embodiment, a latch assembly includes a body having an arm extending to a shaft defining an axis. The latch assembly further includes a hinge configured to slide in a tangential direction to the axis into engagement with the shaft and configured to rotate about the shaft to selected angular positions. Also, the latch assembly includes a retaining bracket configured for fixed connected to the body and for selective engagement with the hinge at the selected angular positions.

20 Claims, 4 Drawing Sheets

VEHICLES, LATCHES AND LATCH ASSEMBLIES WITH RETAINING BRACKETS

INTRODUCTION

Vehicles, such as automotive vehicles, include bodies with closures, such as covers, lids or the like, which are rotatably supported on the vehicle body for movement between open and closed positions. Such closures may include battery access doors, fuse access doors, load floors and other compartment doors.

It is desirable to provide the capability to hold a closure in an open position. For example, it is desirable to provide hold open devices to hold a closure in an open position. Further, it is desirable to provide such a hold open device to hold a closure in a plurality of open positions.

It is desirable to inhibit disengagement of a closure and to prevent a closure from dislodging or "flying away" from or within the vehicle, for example during abrupt deceleration or acceleration.

Accordingly, it is desirable to provide vehicles, latches, and latch assemblies that allow for and hold positioning at a plurality of angular configurations. Further, it is desirable to provide vehicles, latches, and latch assemblies that resist unintentional disengagement during abrupt deceleration or acceleration. Furthermore, other desirable features and characteristics will become apparent from the subsequent detailed description and the appended claims, taken in conjunction with the accompanying drawings and the introduction.

SUMMARY

Vehicles, latches and latch assemblies are provided with retaining brackets for selective engagement with hinges. In an exemplary embodiment, a latch assembly includes a body having an arm extending to a shaft defining an axis. The latch assembly further includes a hinge configured to slide in a tangential direction to the axis into engagement with the shaft and configured to rotate about the shaft to selected angular positions. Also, the latch assembly includes a retaining bracket configured for fixed connected to the body and for selective engagement with the hinge at the selected angular positions.

In an exemplary embodiment, the body defines a void around the shaft, and the hinge includes a hook member. The hook member is configured to pass in the tangential direction into the void for engagement with the body. Further, the hook member is configured to rotate in a circumferential direction about the axis within the void. In such an embodiment, the arm may define an aperture and the retaining bracket may include a first end that extends through the aperture of the arm for fixed connection between the retaining bracket and the body.

Further, in certain embodiments, the hook member defines a channel, and the retaining bracket includes an extension configured to be received in the channel of the hook member. The extension may contact the channel to selectively engage the retaining bracket and the hinge at the selected angular positions. Also, the hook member may define a channel and holes located within the channel, and the retaining bracket may include an extension configured to be received in the holes in the channel of the hook member. The extension may be received in a selected hole to selectively engage the retaining bracket and the hinge at each respective selected angular position. For example, the retaining bracket may include two extensions, wherein each extension is configured to be received in the holes in the channel of the hook member, and wherein each extension is received in a respective selected hole to selectively engage the retaining bracket and the hinge at each respective selected angular position.

In certain embodiments, the body may include a surface separated from the shaft and defining a void between the surface and the shaft. Further, the hinge may include a hook member configured to move in the tangential direction into the void for engagement with the body, and configured to rotate in a circumferential direction about the axis within the void. Also, the retaining bracket may include a second end that contacts the surface of the body to hold the hinge at the selected angular positions.

In an exemplary latch assembly, the body includes a first wall and a second wall, and the shaft extends from the first wall to the second wall. The body may include a surface separated from the shaft and may define a void between the surface and the shaft, wherein the arm extends from the surface to the shaft. Further, the hinge may include a base member configured for attachment to a lid, a first hook portion extending from the base member to a first distal end, and a second hook portion extending from the base member to a second distal end. A gap may be formed between the first hook portion and the second hook portion for receiving the arm of the body. Each hook portion may be formed with a channel facing the gap. Also, a groove may be formed between the base member and the hook portions, and an opening to the groove may be formed between the base member and the distal ends of the hook portions.

An exemplary retaining bracket includes a first end for extending through the aperture of the arm for fixed connection between the retaining bracket and the body, a second end for contacting the surface of the body, a middle portion for receipt within the gap between the first hook portion and the second hook portion, a first extension on a first side of the middle portion for contacting the channel of the first hook portion, and a second extension on a second side of the middle portion for contacting the channel of the second hook portion.

In another embodiment, a latch rotatable between a closed configuration and an open configuration is provided. The latch includes a hinge, a shaft defining an axis, wherein the hinge is rotatable about the shaft to selected angular positions, and a retaining bracket fixed relative to the shaft and in selective engagement with the hinge to prevent disengagement of the hinge from the shaft.

In an exemplary embodiment, the hinge and the retaining bracket are selectively engaged by a pin fit into a channel. In another exemplary embodiment, the hinge forms a channel and the retaining bracket includes a pin, and wherein the hinge and the retaining bracket are selectively engaged by the pin and the channel. In another exemplary embodiment, the latch further includes an arm mounted to the shaft and the retaining bracket is fixed to the arm.

In certain embodiments, the latch further includes an arm mounted to the shaft, the arm forms an aperture, and the retaining bracket includes a first end received in the aperture. Further, the hinge may include a first hook portion, a second hook portion, and a gap formed between the first hook portion and the second hook portion, and the arm may be located in the gap. For example, the gap formed between the first hook portion and the second hook portion may be bound by an inner surface of each hook portion, and the retaining bracket may engage the inner surface of each hook portion. In certain embodiments, the inner surface of the first hook portion may form a first channel, the inner surface of the second hook portion may form a second channel, and the retaining bracket may engage and slide within the first channel and the second channel. Further, in certain embodiments, holes may be formed in first channel and in the second channel, and the retaining bracket may engage selected holes in the each channel.

In another embodiment, a vehicle includes a body forming a compartment, a lid for covering the compartment, and a latch for coupling the lid to the body. The lid may include a hinge rotatable to selected angular positions in an engaged configuration, means for retaining the hinge in the engaged configuration, and means for holding the hinge at a selected angular position.

BRIEF DESCRIPTION OF THE DRAWINGS

The present subject matter will hereinafter be described in conjunction with the following drawing figures, wherein like numerals denote like elements, and wherein.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Embodiments herein provide for a latch assembly that may be interconnected to form a latch that resists disengagement despite large forces such as those encountered during abrupt deceleration or acceleration. Further, the latch provides for holding a hinge (and a lid connected to the hinge) at a selected angle until a user purposefully moves closes the hinge (and lid).

Figure 1:
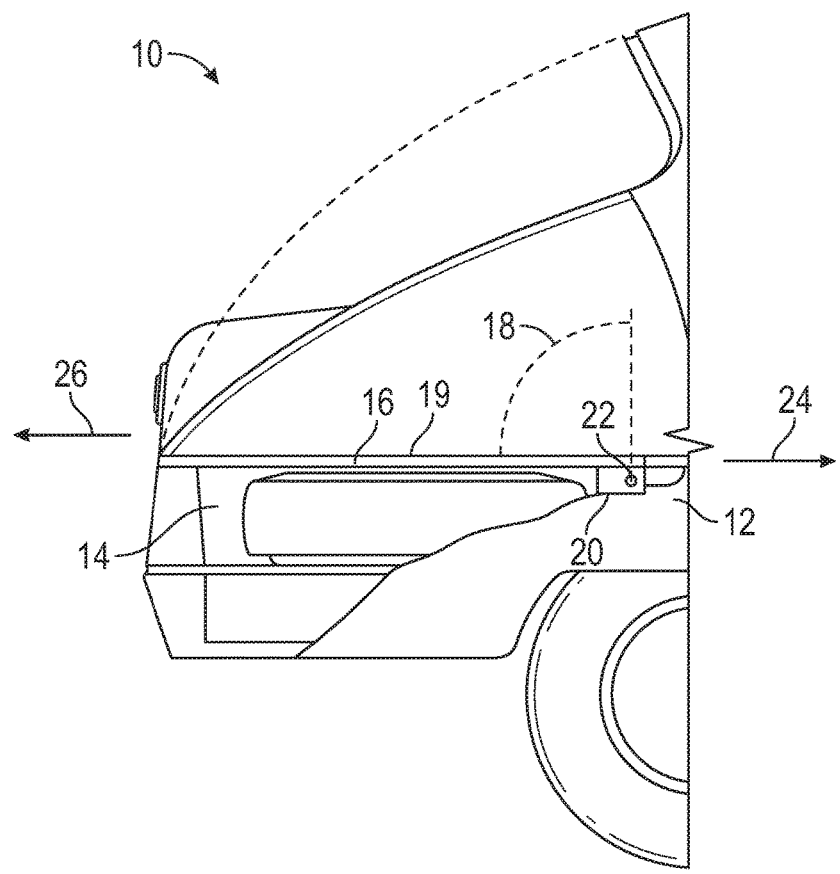
FIG. 1 is a schematic representation of an exemplary embodiment of a vehicle having a latch in accordance with embodiments herein.

FIG. 1 is a schematic representation of an exemplary embodiment of a vehicle 10 including a body 12 forming a cavity 14. In the illustrated embodiment, the cavity 14 is a tire compartment, though the cavity 14 may be any compartment in the vehicle 10, such as a glove compartment, central console compartment, battery compartment, fuse compartment, load floors, or any other compartment formed in the ceiling, walls, floor, seatbacks, visor, or other body structure of the vehicle 10.

As shown, the vehicle 10 further includes a lid or closure 16 for covering the cavity 14. The closure 16 may be opened to a selected angular orientation or angle 18 with respect to the body 12, i.e., with respect to a plane 19 defined by the closure 16 when closed over the cavity 14. The vehicle 10 is provided with a latch assembly coupled together to form a latch 20. Components of the latch assembly may be formed from portions of the body 12 of the vehicle 10 as described below.

The exemplary latch 20 provides for rotation about an axis 22 parallel to plane 19 (as shown) or lying within plane 19, while securing the closure 16 to the body 12. In certain embodiments, the latch 20 inhibits disengagement of the closure 16 from the body 12. For example, typical directions of force applied to the vehicle 10 are illustrated as a forward direction indicated by arrow 24 and a rearward direction indicated by arrow 26. Embodiments herein inhibit disengagement of the closure 16 from the body 12 when forces are applied in either the forward direction 24 or rearward direction 26. Further, embodiments herein limit disengagement of the closure 16 from the body 12 to a narrow range of angular orientations of the closure 16 relative to plane 19. The range of angular orientations that allow for disengagement ("disengagement range") of the closure 16 from the body 12 may provided at any range determined to be suitable during testing. For example, the closure 16 may be opened to 180 degrees, thus, any disengagement range provided between 0 and 180 degrees may be provided. For example, embodiments herein may inhibit disengagement of the closure 16 from the body 12 unless the closure 16 is at an angular orientation 18 of from about 10 to about 20, about 20 to about 30, about 30 to about 40, about 40 to about 50, about 50 to about 60, about 60 to about 70, about 70 to about 80, about 80 to about 90 degrees relative to the body 12 as described below.

Figure 2:
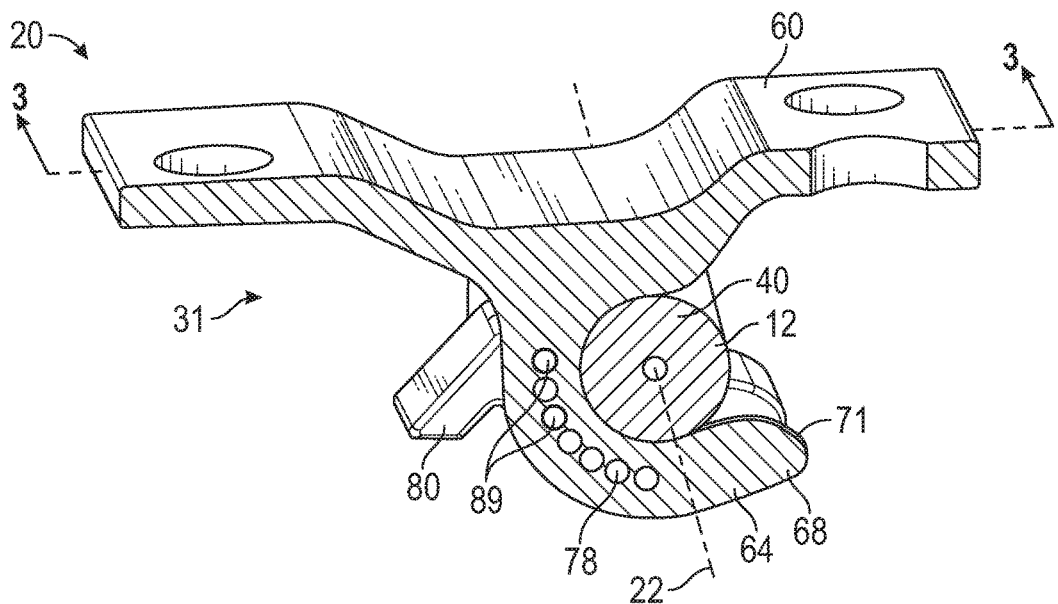
FIG. 2 is a perspective view of portions of the latch of FIG. 1 in a closed configuration in accordance with embodiments herein.
Figure 3:
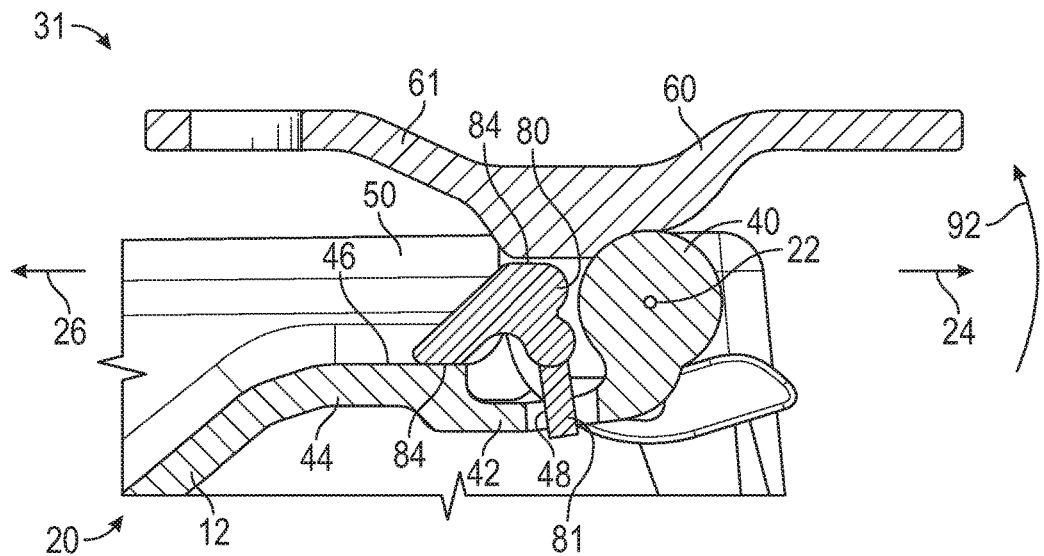
FIG. 3 is a cross section view of the latch of FIG. 2 taken along line 3-3 and including additional portions of the body not shown in FIG. 2 in accordance with embodiments herein.
Figure 4:
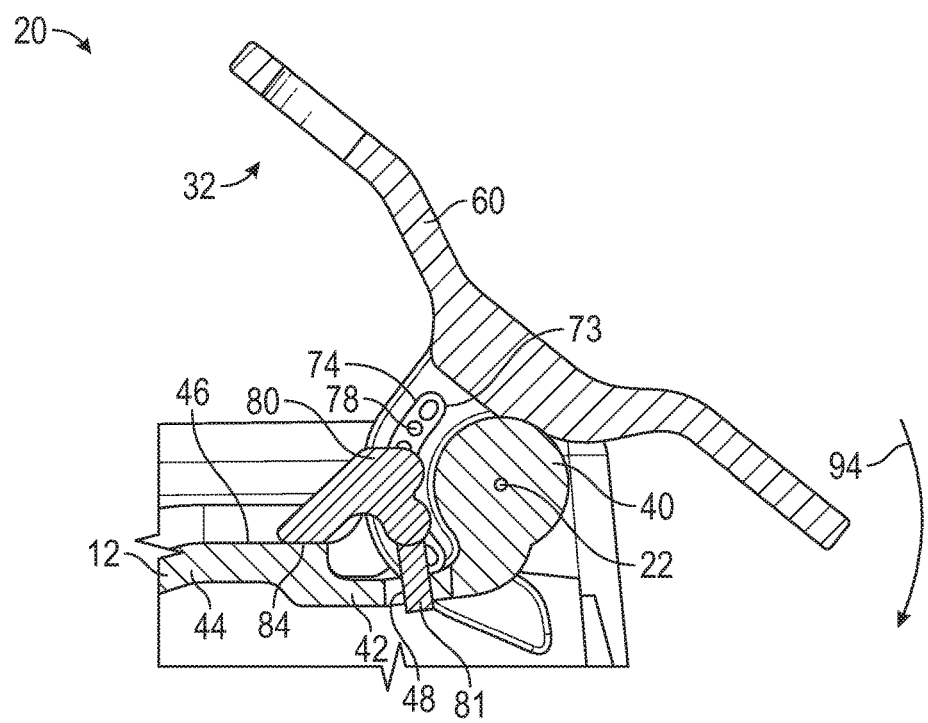
FIG. 4 is a cross section view of the latch of FIG. 3, after rotation of the hinge to an opened configuration in accordance with embodiments herein.

FIG. 2 is a perspective view of the latch 20 in a closed configuration 31 as shown in FIG. 1. FIG. 2 isolates the latch 20 from other components for clarity. FIG. 3 is a cross section view of the latch 20 of FIG. 2, taken along line 3-3 in FIG. 2, and shows additional details of the body 12. FIG. 4 is a cross section view of the latch 20 of FIG. 3, shown in an opened configuration 32.

In the embodiment of FIG. 2, the latch 20 is formed by a portion of the body 12. Specifically, the body 12 forms a shaft 40 that defines the axis 22. Further, the latch 20 includes a hinge 60. Also, the latch 20 includes a retaining bracket 80.

Figure 5:
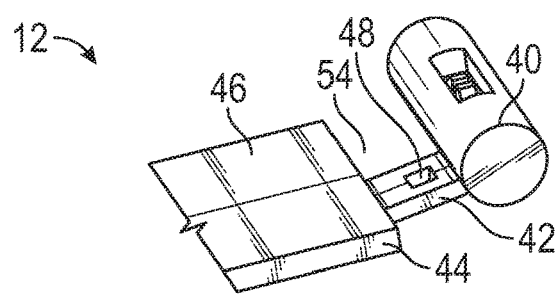
FIG. 5 is a perspective view of an embodiment of the body of the latch of FIGS. 2-4, shown in isolation, in accordance with embodiments herein.

FIG. 5 provides a perspective view of an embodiment of the body 12 in isolation. As shown in FIGS. 3 and 5, the shaft 40 is connected to an arm 42 that is connected to a central portion 44. The central portion 44 forms an upper surface 46. Further, the exemplary arm 42 is formed with an aperture 48 passing completely through the arm 42.

Further, as shown in FIG. 3, the shaft 40 may be interconnected between opposite sidewalls 50 of the body 12

Figure 9:
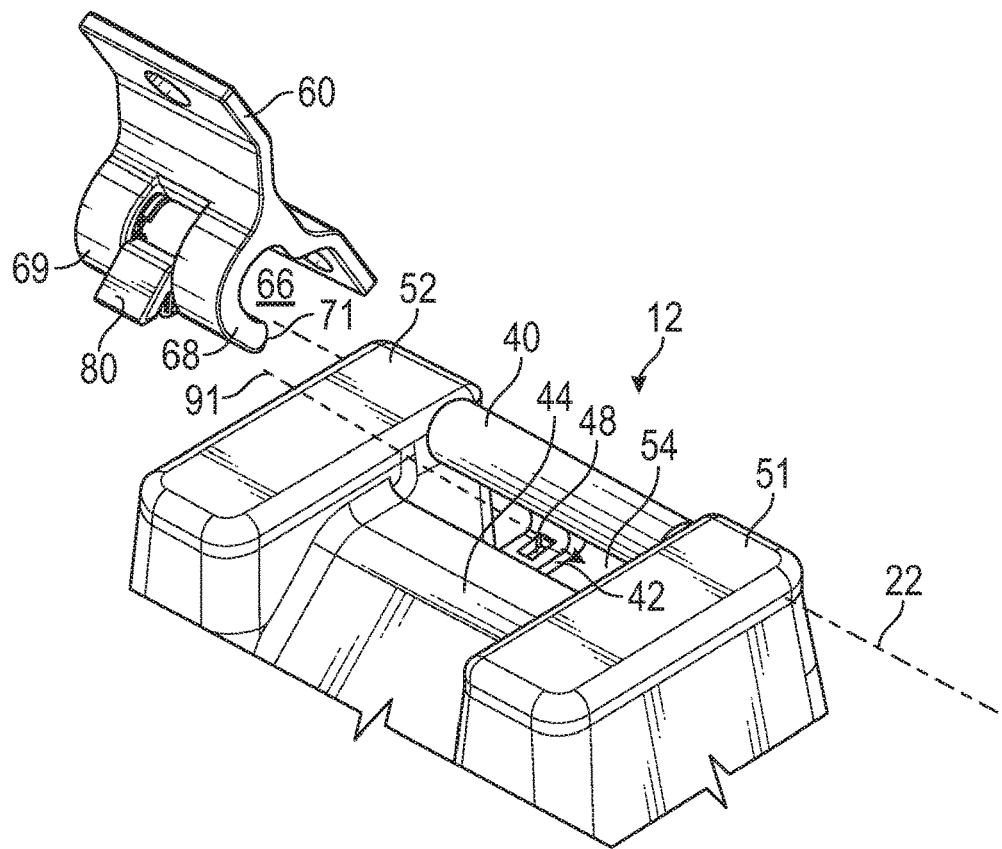
FIG. 9 is a perspective view of the hinge and retaining bracket interconnected for engagement with the body in accordance with embodiments herein.

(only one sidewall 50 is shown to the rear of the shaft 40 in FIG. 3). Sidewalls 50, including first sidewall 51 and second sidewall 52 are illustrated in FIG. 9.

As shown in FIG. 5, a void 54 is formed around the shaft 40, including between the shaft 40 and the surface 46 of the central portion 44. The arm 42 extends through the void 54 to interconnect the shaft 40 and the central portion 44.

Figure 6:
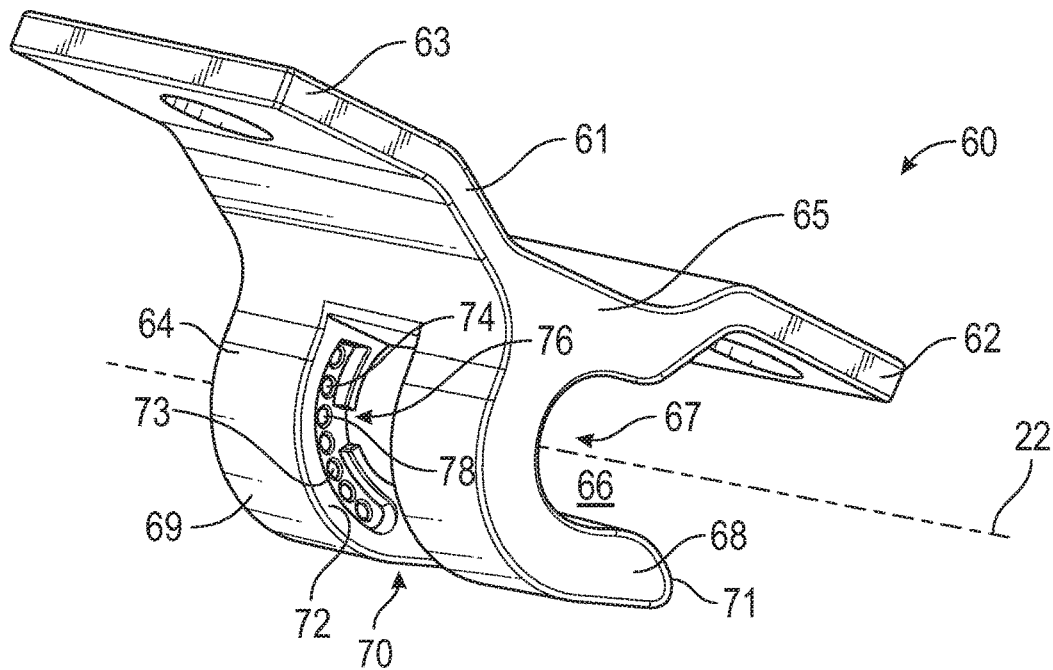
FIG. 6 is a perspective view of an embodiment of the hinge of the latch of FIGS. 2-4, shown in isolation, in accordance with embodiments herein.

Referring back to FIGS. 2 and 3, the hinge 60 is shown in engagement with the shaft 40, i.e., positioned in the void 54 of FIG. 5. FIG. 6 provides a perspective view of an embodiment of the hinge 60 in isolation. Cross referencing FIGS. 2, 3 and 6, the exemplary hinge 60 is shown to be generally J-shaped. Exemplary hinge 60 includes an upper base member 61 including a forward wing 62 and a rearward wing 63. The forward wing 62 and rearward wing 63 may be secured to the closure 16 of FIG. 1 via a connection element such as a screw, bolt or other suitable means. Further, the hinge 60 includes a hook member 64 interconnected to the base member 61 at approximately a midpoint 65 between the forward wing 62 and the rearward wing 63. A groove 66 is defined between the hook member 64 and the base member 61. The exemplary groove 66 is cylindrical and is centered about axis 22. As shown, while the hook member 64 partially surrounds the groove 66 and defines an opening 67 to the groove 66.

An exemplary hook member 64 includes a first hook portion 68 and a second hook portion 69 separated by a gap 70, as shown most clearly in FIG. 6. Each hook portion 68 and 69 of the hook member 64 terminates at a distal end 71. Further, each hook portion 68 and 69 includes an inner surface 72 facing and bounding the gap 70. A channel 73 is formed in each inner surface 72. In the exemplary embodiment, each channel 73 is curvilinear. More specifically, each channel 73 forms an arc centered about axis 22. Each channel 73 is surrounded by a sidewall 74 that extends from the channel 73 to the inner surface 72. As shown, the sidewall 74 does not completely surround the channel 73. An opening 76 to the channel 73 is formed where opposite ends of the sidewall 74 extend to the groove 66. As further shown in FIG. 6, a series of holes 78 are formed in each channel 73. The holes 78 may extend completely through each hook portion 68 and 69 as shown in FIG. 2, or may be blind, i.e., not extend through the hook portions 68 and 69, as shown in FIG. 6. In an exemplary embodiment, the holes 78 extend along an arc centered about the axis 22.

Figure 7:
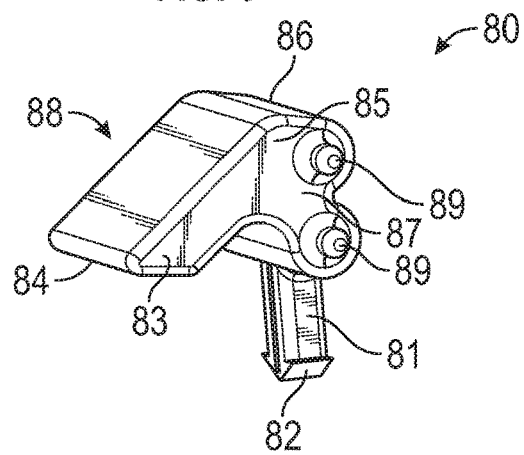
FIG. 7 is a perspective view of an embodiment of the retaining bracket of the latch of FIGS. 2-4, shown in isolation, in accordance with embodiments herein.

Referring back to FIGS. 2 and 3, the retaining bracket 80 is shown in engagement with the hinge 60 and in engagement with the body 12. Specifically, the retaining bracket 80 engages selected holes 78 in the hinge 60 and engages the aperture 48 in the arm 42 of the body 12. FIG. 7 provides a perspective view of an embodiment of the retaining bracket 80 in isolation. Cross referencing FIGS. 2, 3 and 7, the exemplary retaining bracket 80 is shown to be substantially V-shaped and includes a first leg 81 that terminates at a first end 82, a second leg 83 that terminates at a second end 84, and an apex or middle portion 85 where the first leg 81 and second leg 83 are joined. The retaining bracket 80 includes a top side 86 at the middle portion 85. Further, the retaining bracket 80 includes a first side 87 and an opposite second side 88. Extensions 89 extend from each side 87 and 88. In an exemplary embodiment, the extensions 89 on each side 87 and 88 include a pair of pins.

Figure 8:
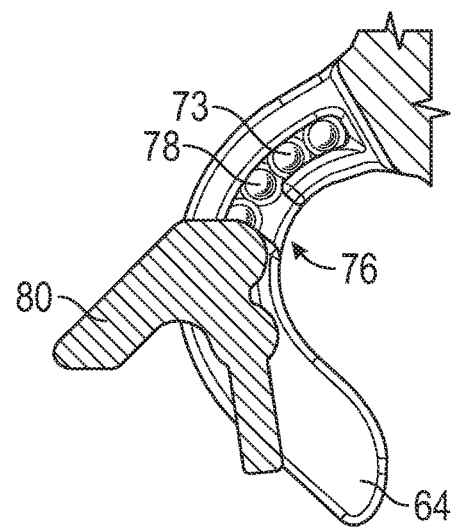
FIG. 8 is a cross sectional view of the hinge and retaining bracket, similar to that of FIG. 3, with the hinge rotated to an opened configuration and with the body removed for clarity in accordance with embodiments herein.

FIG. 8 is a cross section view, similar to FIG. 3, of the hook member 64 and the retaining bracket 80 with the hook member 64 rotated to an opened configuration and with the body 12 removed for clarity. FIG. 8 illustrates a selective engagement between the hook member 64 and the retaining bracket 80. As can be understood from cross-referencing FIG. 8 with FIGS. 6 and 7, the retaining bracket 80 is engaged with the hook member 64 by sliding the retaining bracket 80 into the gap 70 and inserting the extensions 89 on sides 87 and 88 through the openings 76 and into the channels 73. After insertion into a respective channel 73, each respective set of extensions 89 may slide within the respective channel 73. Further, each respective set of extensions 89 may enter into holes 78 in the respective channel 73. In an exemplary embodiment, the spacing between adjacent holes equals half of the spacing between the extensions 89 on each side 87 and 88. A friction fit between the extensions 89 and holes 78 may hold the position of the hook member 64 (and hinge 60) relative to the retaining bracket 80.

FIG. 9 illustrates the retaining bracket 80 in engagement with the hook member 64 of the hinge 60 and prepared for engagement with the body 12. In FIG. 9, the central portion 44 and shaft 40 of the body 12 extend between a first sidewall 51 and a second sidewall 52. As shown, the conjoined hinge 60 and retaining bracket 80 are moved in the direction of arrow 91, tangential to axis 22, to engage the body 12. Specifically, the distal ends 71 of the hook portions 68 and 69 slide through the void 54 between the shaft 40 and the central portion 44 and the hook member 64 receives the shaft 40 in the groove 66. Further, the first end 82 of the first leg 81 (hidden in FIG. 9) of the retaining bracket 80 passes through the aperture 48 in the arm 42 of the body 12. As a result, the first leg 81 is received in the aperture 48.

FIG. 3 illustrates the engagement of the body 12, hinge 60 and retaining bracket 80 after movement of the hinge 60 and retaining bracket 80 in the direction of arrow 91 in FIG. 9. In FIG. 3, the hinge 60 is fully rotated in the counterclockwise circumferential direction indicated by arrow 92, such that a closure 16 connected to the hinge 60 would be in a closed configuration 31. As shown, a portion of the base member 61 of the hinge rests on the top side 84 of the retaining bracket 80 positioned in the gap 70. Further, the second end 84 of the retaining bracket 80 contacts the upper surface 46 of the central portion 44 of the body 12. Also, the first leg 81 of the retaining bracket 80 is located in the aperture 48 in the arm 42 of the body 12. Thus, further movement of the hinge 60 in the direction of arrow 92 is mechanically stopped.

In FIG. 2, it may be seen that the extensions 89 extend from the retaining bracket 80 and into the uppermost and third uppermost holes 78 in the hook member 64. Referring to FIG. 3, a force in the direction of arrow 24 or arrow 26 does not cause disengagement of the hinge 60 from the body 12 because the hinge 60 cannot be disconnected from the retaining bracket 80 and the retaining bracket 80 cannot be disconnected from the body 12 by forces in the direction of arrows 24 or 26. Rather, the direction of force must be applied in alignment with the opening 76 (shown in FIG. 8) and the extensions 89 in order to free the extensions 89 from the channel 73 to remove the hinge 60 from the retaining bracket 80. Further, the direction of force must be applied opposite to the direction of arrow 91 in FIG. 9 to remove the first leg 81 of the retaining bracket 80 from the aperture 48 in the arm 42 of the body 12.

FIG. 4 illustrates the latch 20 of FIG. 3, after rotation of the hinge 60 in the clockwise circumferential direction of arrow 94, to a selected angle. As shown, a closure 16 connected to the hinge 60 would be in an opened configuration 32. In FIG. 4, the second end 84 of the retaining bracket 80 remains in contact with the upper surface 46 of the central portion 44 of the body 12. Also, the first leg 81 of the retaining bracket 80 remains in the aperture 48 in the arm 42 of the body 12. In fact, the retaining bracket 80 and body 12 remain in the same position as in FIG. 3. The hinge 60 moves by sliding the channels 73 of the hook member 64 relative to the extensions 89 of the retaining bracket 80. The sidewall 74 around the channel 73 prevents disengagement of the hinge 60 from the retaining bracket 80 while the hinge 60 is rotated about the shaft 40. A friction fit between the holes 78 and the extensions 89 provide for holding the hinge 60 in a desired configuration, i.e., at a selected angle, relative to the body 12.

It is noted that FIGS. 5, 6 and 7 illustrate the body 12, hinge 60, and retaining bracket 80 in isolation, and may be considered to collectively illustrate a latch assembly. After being connected, the components of the latch assembly form the latch 20.

As described herein, latch assemblies, latches and vehicles with latches are provided. Engagement between the body, hinge, and retaining bracket provide for holding the hinge at a selected angular position. Further, engagement between the body, hinge, and retaining bracket provide for inhibiting unintentional disengagement of the hinge from the body, such as due to forces from a sudden deceleration or acceleration of the vehicle.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the claimed subject matter in any way. Rather, the foregoing detailed description will provide those skilled in the art with a convenient road map for implementing an exemplary aspect of the subject matter. It being understood that various changes may be made in the function and arrangement of elements described in an exemplary aspect without departing from the scope of the subject matter as set forth in the appended claims.

What is claimed is:

1. A latch assembly comprising:
a body including an arm extending to a shaft defining an axis;
a hinge configured to slide in a tangential direction to the axis into engagement with the shaft and configured to rotate about the shaft to selected angular positions; and
a retaining bracket configured for fixed connection to the body and for selective engagement with the hinge at the selected angular positions.

2. The latch assembly of claim 1 wherein:
the body defines a void around the shaft; and
the hinge includes a hook member configured to pass in the tangential direction into the void for engagement with the body, and configured to rotate in a circumferential direction about the axis within the void.

3. The latch assembly of claim 2 wherein:
the arm defines an aperture; and
the retaining bracket includes a first end, wherein the first end extends through the aperture of the arm for fixed connection between the retaining bracket and the body.

4. The latch assembly of claim 3 wherein:
the hook member defines a channel; and
the retaining bracket includes an extension configured to be received in the channel of the hook member, wherein the extension contacts the channel to selectively engage the retaining bracket and the hinge at the selected angular positions.

5. The latch assembly of claim 3 wherein:
the hook member defines a channel and holes located within the channel; and
the retaining bracket includes an extension configured to be received in the holes in the channel of the hook member, wherein the extension is received in a selected hole to selectively engage the retaining bracket and the hinge at each respective selected angular position.

6. The latch assembly of claim 3 wherein:
the hook member defines a channel and holes located within the channel; and
the retaining bracket includes two extensions, wherein each extension is configured to be received in the holes in the channel of the hook member, wherein each extension is received in a respective selected hole to selectively engage the retaining bracket and the hinge at each respective selected angular position.

7. The latch assembly of claim 1 wherein:
the body includes a surface separated from the shaft and defines a void between the surface and the shaft;
the hinge includes a hook member configured to move in the tangential direction into the void for engagement with the body, and configured to rotate in a circumferential direction about the axis within the void; and
the retaining bracket includes a second end, wherein the second end contacts the surface of the body to hold the hinge at the selected angular positions.

8. The latch assembly of claim 1 wherein the body includes a first wall and a second wall, wherein the shaft extends from the first wall to the second wall, wherein the body includes a surface separated from the shaft and defines a void between the surface and the shaft, and wherein the arm extends from the surface to the shaft.

9. The latch assembly of claim 8 wherein the hinge includes a base member configured for attachment to a lid, a first hook portion extending from the base member to a first distal end, and a second hook portion extending from the base member to a second distal end, wherein a gap is formed between the first hook portion and the second hook portion for receiving the arm of the body, wherein each hook portion is formed with a channel facing the gap, wherein a groove is formed between the base member and the hook portions, and wherein an opening to the groove is formed between the base member and the distal ends of the hook portions.

10. The latch assembly of claim 9 wherein:
the arm defines an aperture, and
the retaining bracket includes a first end for extending through the aperture of the arm for fixed connection between the retaining bracket and the body, a second end for contacting the surface of the body, a middle portion for receipt within the gap between the first hook portion and the second hook portion, a first extension on a first side of the middle portion for contacting the channel of the first hook portion, and a second extension on a second side of the middle portion for contacting the channel of the second hook portion.

11. A latch rotatable between a closed configuration and an open configuration, the latch comprising:
a hinge;
a shaft defining an axis, wherein the hinge is rotatable about the shaft to selected angular positions; and
a retaining bracket fixed relative to the shaft and in selective engagement with the hinge to prevent disengagement of the hinge from the shaft.

12. The latch of claim 11 wherein the hinge and the retaining bracket are selectively engaged by a pin fit into a channel.

13. The latch of claim 12 wherein the hinge forms a channel and the retaining bracket includes a pin, and wherein the hinge and the retaining bracket are selectively engaged by the pin and the channel.

14. The latch of claim 11 further comprising an arm mounted to the shaft, wherein the retaining bracket is fixed to the arm.

15. The latch of claim 11 further comprising an arm mounted to the shaft, wherein the arm forms an aperture, and wherein the retaining bracket includes a first end received in the aperture.

16. The latch of claim 11 further comprising an arm mounted to the shaft; wherein the hinge includes a first hook portion, a second hook portion, and a gap formed between the first hook portion and the second hook portion; and wherein the arm is located in the gap.

17. The latch of claim 11 wherein the hinge includes a first hook portion, a second hook portion, and a gap formed between the first hook portion and the second hook portion and bound by an inner surface of each hook portion; and wherein the retaining bracket engages the inner surface of each hook portion.

18. The latch of claim 11 wherein the hinge includes a first hook portion with an inner surface forming a first channel, a second hook portion with an inner surface forming a second channel, and a gap formed between the inner surface of the first hook portion and the inner surface of the second hook portion; and wherein the retaining bracket engages and slides within the first channel and the second channel.

19. The latch of claim 11 wherein the hinge includes a first hook portion with an inner surface forming a first channel and with holes formed in the first channel, a second hook portion with an inner surface forming a second channel and with holes formed in the second channel, and a gap formed between the inner surface of the first hook portion and the inner surface of the second hook portion; and wherein the retaining bracket engages selected holes in the each channel.

20. A vehicle comprising:
a body forming a compartment;
a lid for covering the compartment; and
a latch for coupling the lid to the body, wherein the latch includes:
a hinge rotatable to selected angular positions in an engaged configuration; and
a retaining bracket configured for fixed connection to the body and for selective engagement with the hinge at the selected angular positions.

* * * * *